(12) United States Patent
Mannor et al.

(10) Patent No.: US 9,216,702 B1
(45) Date of Patent: Dec. 22, 2015

(54) LOCKING SEAM ALIGNMENT GUIDE FOR INTERIOR TRIM COMPONENT COVER

(71) Applicant: Leon Plastics Inc., Grand Rapids, MI (US)

(72) Inventors: Brent T. Mannor, Caledonia, MI (US); Michael D. Bicard, Jenison, MI (US); William I. Yowaish, Grand Rapids, MI (US)

(73) Assignee: Leon Plastics, Inc., Grand Rapids, MI (US)

( * ) Notice: Subject to any disclaimer, the term of this patent is extended or adjusted under 35 U.S.C. 154(b) by 47 days.

(21) Appl. No.: 13/927,625

(22) Filed: Jun. 26, 2013

Related U.S. Application Data

(60) Provisional application No. 61/664,237, filed on Jun. 26, 2012, provisional application No. 61/701,925, filed on Sep. 17, 2012.

(51) Int. Cl.
*D05B 35/06* (2006.01)
*B60N 2/58* (2006.01)
*B60R 13/02* (2006.01)
*D05B 97/10* (2006.01)
*F16B 2/22* (2006.01)
*D05B 15/00* (2006.01)

(52) U.S. Cl.
CPC .......... *B60R 13/0206* (2013.01); *B60N 2/5883* (2013.01); *D05B 35/06* (2013.01); *D05B 97/10* (2013.01); *F16B 2/22* (2013.01); *D05B 15/00* (2013.01)

(58) Field of Classification Search
CPC .......... D05B 13/00; D05B 15/00; D05B 3/12; D05B 35/06; D05B 35/062; B29C 44/1233; B29C 44/1214; A44B 18/0046; A44B 18/0049; A44B 18/0057; A44B 18/0061; B06N 2/2826; B06N 2/5883; B60N 2/5883; A47C 7/02; A47C 31/023
USPC ............. 112/475.08, 475.14, 475.17, 470.27; 264/46.5; 297/218.1, 218.2, 452.6; 428/99, 122
See application file for complete search history.

(56) References Cited

U.S. PATENT DOCUMENTS

| | | | | |
|---|---|---|---|---|
| 3,298,743 | A * | 1/1967 | Albinson et al. | 297/451.4 |
| 3,630,572 | A * | 12/1971 | Homier | 297/452.6 |
| 5,236,243 | A * | 8/1993 | Reyes | 297/219.1 |
| 7,287,305 | B2 * | 10/2007 | Bednarski | 24/297 |
| 7,401,829 | B2 | 7/2008 | Michalski et al. | |
| 7,549,708 | B2 | 6/2009 | Wieczorek et al. | |
| 7,752,985 | B2 * | 7/2010 | Morita et al. | 112/475.04 |
| 8,752,902 | B2 * | 6/2014 | Labish | 297/452.6 |
| 2002/0101109 | A1 * | 8/2002 | Stiller et al. | 297/452.6 |
| 2009/0033131 | A1 * | 2/2009 | Clauser et al. | 297/218.4 |
| 2009/0064471 | A1 * | 3/2009 | Santin et al. | 24/581.11 |
| 2012/0240364 | A1 * | 9/2012 | Voigt | 24/449 |

* cited by examiner

*Primary Examiner* — Ismael Izaguirre
(74) *Attorney, Agent, or Firm* — McGarry Bair PC

(57) ABSTRACT

A locking seam alignment guide may be utilized for attaching a fabric cover to a substrate to form an interior trim component in a vehicle passenger compartment. An elongate ribbon-like member has a longitudinal stitching flange and a longitudinal locking key depending from the stitching flange along a midline thereof. The longitudinal locking key has one of a cylindrical shape, and a triangular shape. The longitudinal stitching flange is one of a flange extending along one side of the midline, and a flange extending along both sides of the midline. The locking seam alignment guide can be stitched to a fabric cover and seated in a complementary keyway to hold the fabric cover to the substrate.

13 Claims, 6 Drawing Sheets

LOCKING SEAM ALIGNMENT GUIDE FOR INTERIOR TRIM COMPONENT COVER

CROSS-REFERENCE TO RELATED APPLICATIONS

This application claims the benefit of U.S. Applications No. 61/664,237, filed Jun. 26, 2012, and No. 61/701,925, filed Sep. 17, 2012, each of which is incorporated by reference herein in its entirety.

BACKGROUND OF THE INVENTION

1. Field of the Invention

The invention relates generally to interior trim components for a vehicle passenger compartment. More specifically, the invention relates to alignment of cover seams in cover fabric extending over cushioned or uncushioned trim components that have an attached alignment guide for locking the cover to an underlying substrate.

2. Description of the Related Art

Vehicle trim components for passenger compartments, such as armrests, center consoles, dashboards, and the like, may have a leather or leather-like cover wrapped over and around a cushion layer, referred to as "soft-wrapped," or attached directly to a rigid substrate, or support structure. The fabric cover may be shaped to match the shape of a cushion or support structure, thereby facilitating the cover attachment process and providing a neat appearance. The cover may include stitching, such as a French stitch or deck stitch, which may correspond to a change in a surface profile, such as a corner.

The cover may be wrapped relatively tightly around and attached to the cushion and substrate. Attachment may be by tacks, staples, adhesives, and the like, generally in areas of the cover that are hidden from view, such as along an inside edge of a substrate. This may result in large areas of the cover in contact with the cushion or substrate but not otherwise attached to the cushion or substrate. Consequently, movement of the cover relative to the cushion or substrate may occur during assembly and use.

BRIEF DESCRIPTION OF THE INVENTION

A locking seam alignment guide may be utilized for attaching a fabric cover to a substrate to form an interior trim component in a vehicle passenger compartment. An elongate ribbon-like member has a longitudinal stitching flange and a longitudinal locking key depending from the stitching flange along a midline thereof. The longitudinal locking key has one of a cylindrical shape, and a triangular shape. The longitudinal stitching flange is one of a flange extending along one side of the midline, and a flange extending along both sides of the midline. The locking seam alignment guide can be stitched to a fabric cover and seated in a complementary keyway to hold the fabric cover to the substrate.

DESCRIPTION OF THE INVENTION

The invention will be described and illustrated in terms of an exemplary embodiment comprising an interior trim component such as may be incorporated into a vehicle interior. The invention may be described and illustrated in terms of an embodiment comprising an exemplary leather-like flexible fabric cover having French seams. The invention may also be described in terms of alternate seams such as deck seams without limiting the scope of the claims. The invention may also be described in terms of alternate embodiments, and no description and/or illustration of the interior trim component or other aspect of an embodiment should in any way be inferred as limiting on the invention or the scope of the claims.

Figure 1:
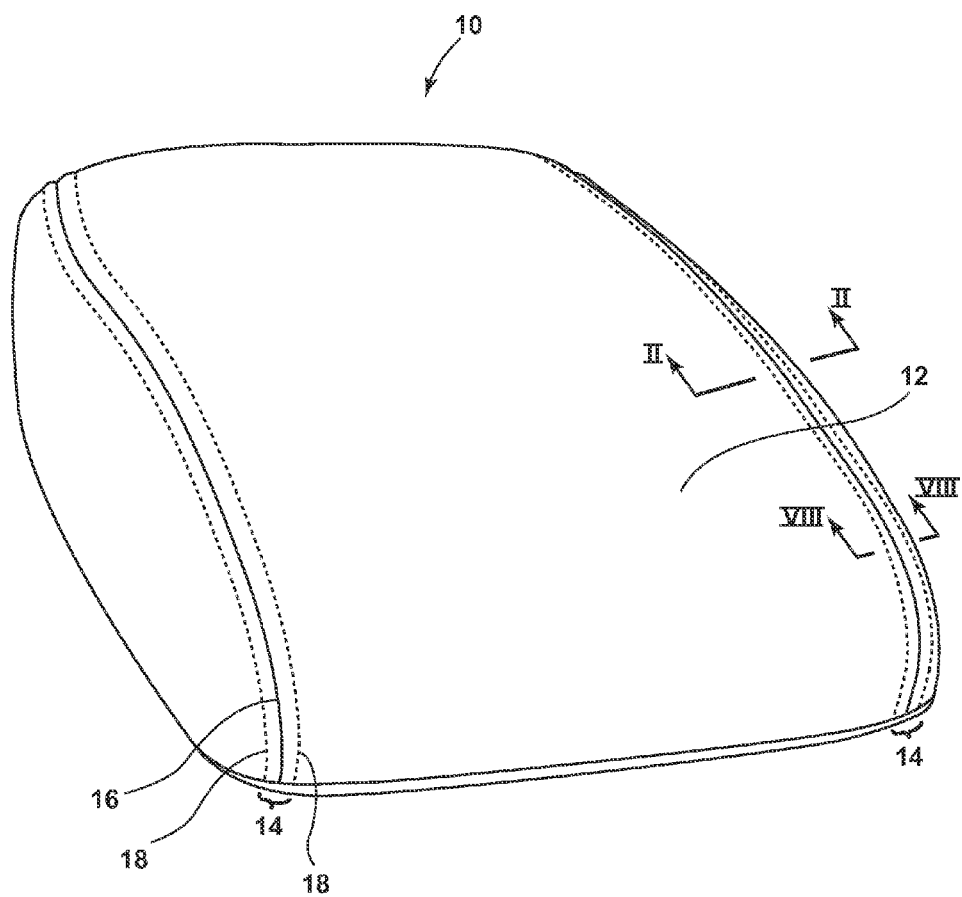
FIG. 1 is a perspective view of an interior trim component comprising a stitched fabric cover with a locking seam alignment guide according to an exemplary embodiment of the invention.
Figure 2:
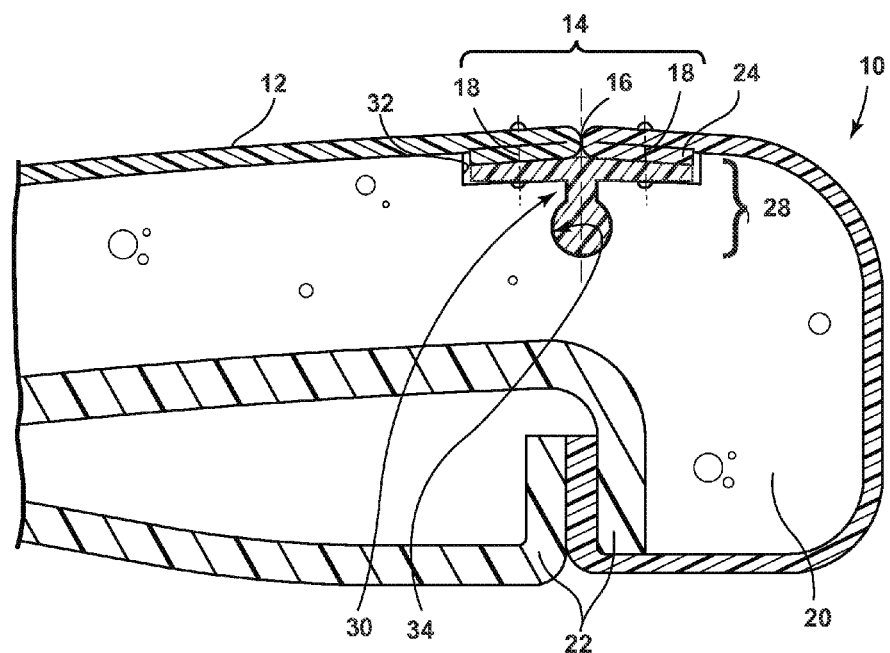
FIG. 2 is a sectional view taken along view line 2-2 of a portion of the interior trim component illustrated in FIG. 1 disclosing an embodiment of the locking seam alignment guide.

Referring now to the Figures, and to FIG. 1 in particular, an exemplary interior trim component 10 is illustrated comprising a stitched cover 12 formed, in part, with French seams 14. The French seams 14 may be manufactured in a generally known manner, and may comprise a center butt seam 16 and a pair of generally parallel side stitchings 18. Referring also to FIG. 2, the stitched cover 12 may be wrapped around a cushion 20 supported by and attached to a rigid substrate 22.

The rigid substrate 22 may be configured consistent with the purposes for which it may be intended, such as a vehicle center console, an arm rest, a dashboard, and the like (not shown). The rigid substrate 22 may also be configured to support the stitched cover 12 in a manner consistent with the aesthetics and functionality of the interior trim component 10. The rigid substrate 22 may be fabricated of a material having properties, such as strength, rigidity, and the like, which are suitable for the purposes for which it may be intended.

The cushion 20 may be fabricated of a material having properties, such as stiffness, compressibility, resiliency, softness, and the like, which are suitable for use in the cushioned interior trim component 10. Alternate materials may be utilized for the cushion 20, such as foam, batting, and the like. The assembly may alternatively comprise a composite structure at least partially including a cushion (not shown) overlying a part of the rigid substrate 22 or a separate component.

Figure 3:
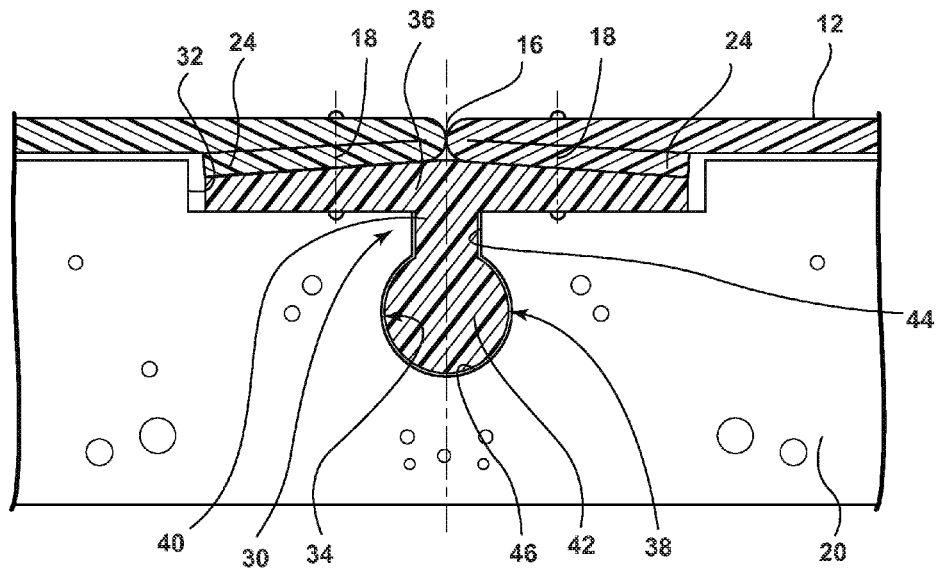
FIG. 3 is an enlarged sectional view of a portion of the interior trim component illustrated in FIG. 2.

The stitched cover 12 may be manufactured from several individual pieces of fabric, leather, or leather-like material, and stitched together with French seams 14. Alternatively, the stitched cover 12 may be fabricated from a single piece of material that has been stitched along selected lines to mimic French seams 14. As illustrated in FIGS. 2 and 3, if a true French seam is utilized, a seam allowance 24 may be folded under and stitched against the underside of the cover 12. This may result in a double thickness of cover material characterized by a width equal to the width of the two seam allowances 24.

Figure 4:
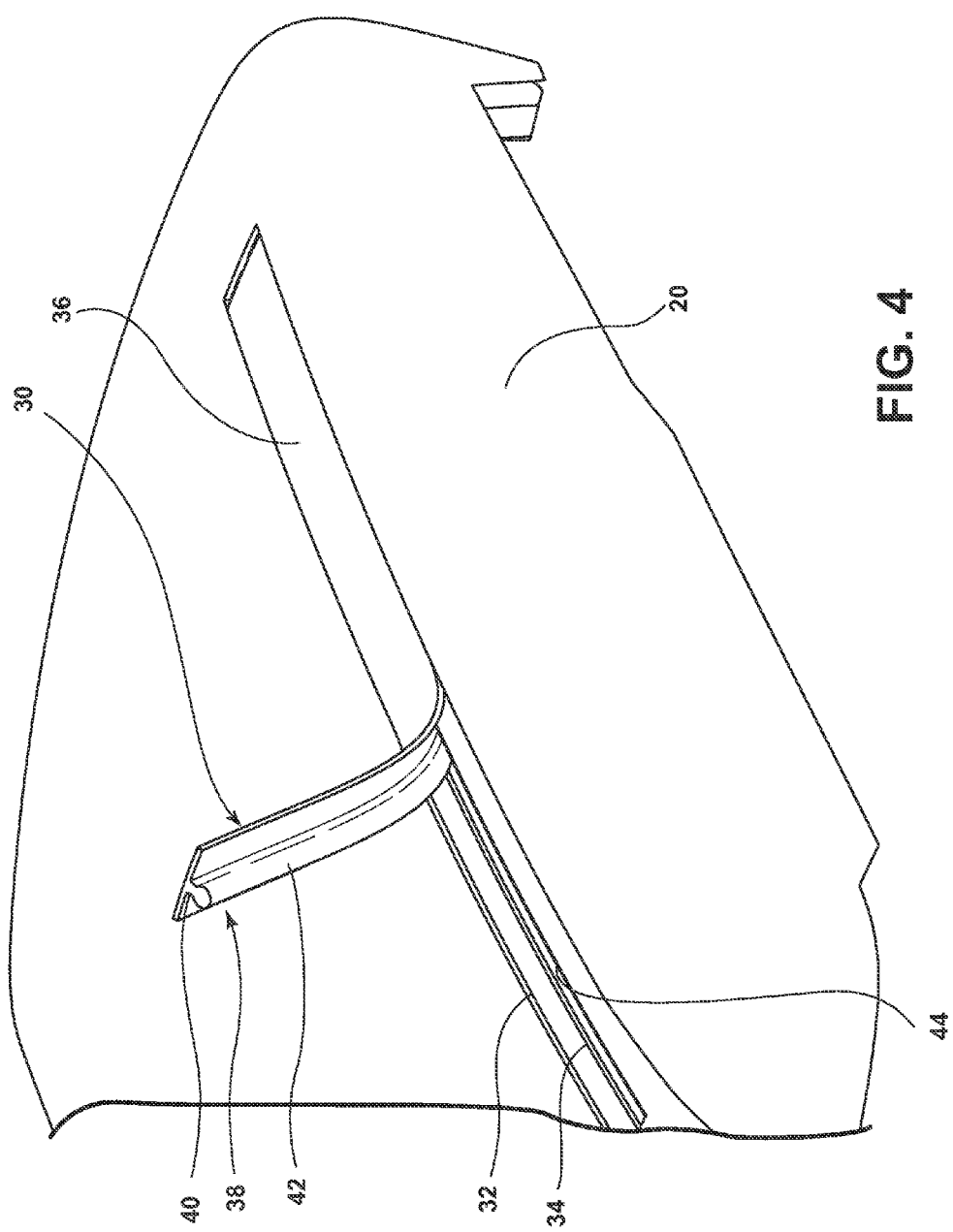
FIG. 4 is an enlarged perspective view of a portion of the interior trim component illustrated in FIG. 1 disclosing a cushion with an incised keyway, and a correlative locking seam alignment guide partly installed in the keyway.

Referring also to FIG. 4, a locking seam alignment guide 30 may be a ribbon-like somewhat T-shaped member comprising a double flange 36, also referred to as a stitching flange, with a locking key 38 depending therefrom along a midline thereof. The locking key 38 may comprise a thin neck 40 transitioning from the double flange 36 to a rounded head 42 having a diameter greater than the width of the neck 40. The locking seam alignment guide 30 may be fabricated of a material having properties, such as strength, flexibility, and the like, which are suitable for the purposes for which it may be intended. The locking seam alignment guide 30 may be attached to the cover 12 as disclosed in FIG. 3 by the side stitching 18 penetrating through each side of the double flange 36 as the French seam 14 is stitched.

The cushion 20 may include an alignment guide recess 28 comprising an obverse keyway 32 configured for functionally cooperative disposition of the locking seam alignment guide 30 therein. The obverse keyway 32 may have a width generally equal to the width of the double flange 36, and a depth generally equal to the thickness of the folded-under seam allowance 24 and double flange 36. Extending along the center of the obverse keyway 32, an incised groove 34 may be formed in the cushion 20 comprising a narrow slot 44 transitioning from the obverse keyway 32 to a reverse keyway 46, having a configuration complementary with the configuration of the locking key 38. Thus, the alignment guide recess 28 may have a somewhat T-shaped configuration defined by a shallow obverse keyway 32, transitioning to a centrally disposed incised groove 34 for receiving the rounded head 42.

The locking seam alignment guide 30 may be joined with the alignment guide recess 28, thereby attaching the locking seam alignment guide 30 and stitched cover 12 to the cushion 20 over the alignment guide recess 28.

The coupling of the locking key 38 with the reverse keyway 46, including the disposition of the longitudinal edges of the double flange 36 against the side walls of the obverse keyway 32, may tend to retain the double flange 36 against the bottom wall of the keyway 32, thereby reducing the potential for lateral movement of the locking seam alignment guide 30 relative to the keyway 32. The coupling of the locking key 38 with the incised groove 34 may further reduce the potential for lateral movement of the locking seam alignment guide 30. Joining the locking seam alignment guide 30 and seam allowance 24 into an integrated structure having a stiffness somewhat greater than the stiffness developed by the French seam alone may "seat" the double flange 36 and seam allowance 24 into the obverse keyway 32 and further minimize lateral movement of the locking seam alignment guide 30 and attached cover 12.

Alternatively, the cover 12 may be molded, followed by adding the side stitching 18 and the locking seam alignment guide 30.

Figure 5:
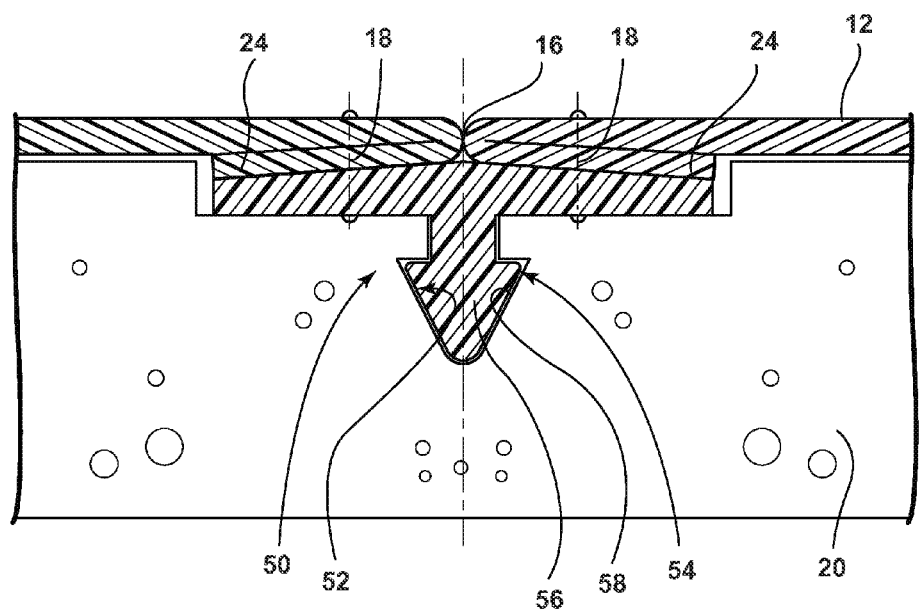
FIG. 5 is an enlarged sectional view taken along view line 2-2 of FIG. 1 disclosing a second embodiment of the locking seam alignment guide.

FIG. 5 illustrates a second embodiment of a locking seam alignment guide 50 which is generally identical to the locking seam alignment guide 30, but substituting an arrow-shaped head 56 for the circular head 42. The incised groove 52 may have a configuration of the reverse keyway 58 complementary to the configuration of the locking key 54. The arrow-shaped locking key 54 may enhance the "pullout" resistance of the locking key 54 as compared with the rounded locking key 38.

Figure 6:
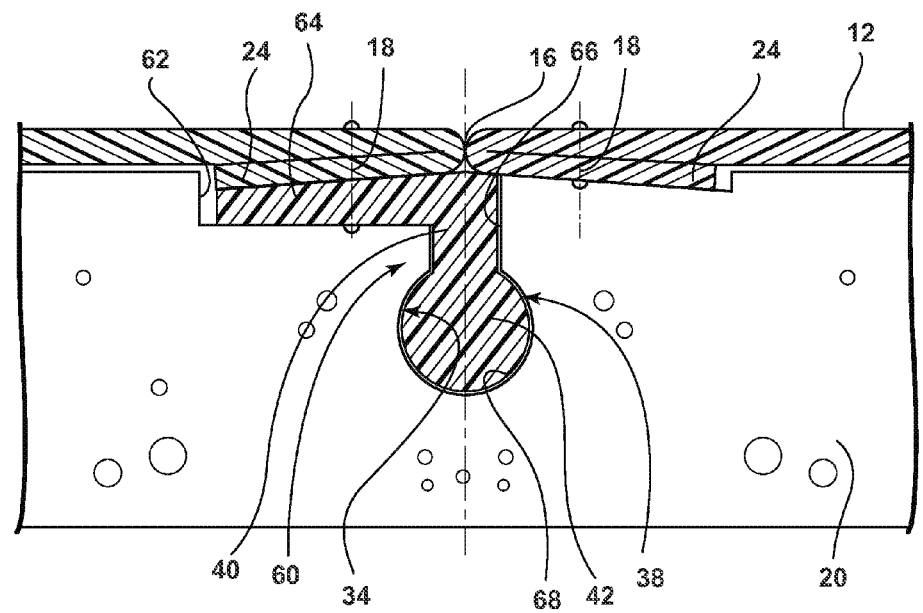
FIG. 6 is an enlarged sectional view taken along view line 2-2 of FIG. 1 disclosing a third embodiment of the locking seam alignment guide.

FIG. 6 illustrates a third embodiment of a locking seam alignment guide 60 which is generally identical to the first embodiment 30, but comprises a single flange 64 extending along one side of the midline, rather than the double flange 36. The keyway 62 may have a width generally one half the width of the keyway 32. The elimination of half a flange may enhance the flexibility of the stitched cover 12 along the French seam 14, while generally retaining the pullout resistance and lateral movement resistance equal to that of the double flange locking seam alignment guide 30.

FIGS. 7-10 illustrate exemplary embodiments of the invention that are generally identical to the aforementioned embodiments except that the stitched cover 12 is attached, at least in part, directly over the rigid substrate 22 without an intervening cushion 20. The exemplary embodiments of FIGS. 7-10 share many features of the embodiments of FIGS. 1-6, and retain common reference characters of FIGS. 1-6 relative to such shared features. Thus, such shared features will not be described further unless necessary for a complete understanding of the invention. The interior trim component 10 may alternatively comprise a composite structure at least partially including a cushion (not shown), overlying a part of the rigid substrate 22 or a separate component.

Figure 7:
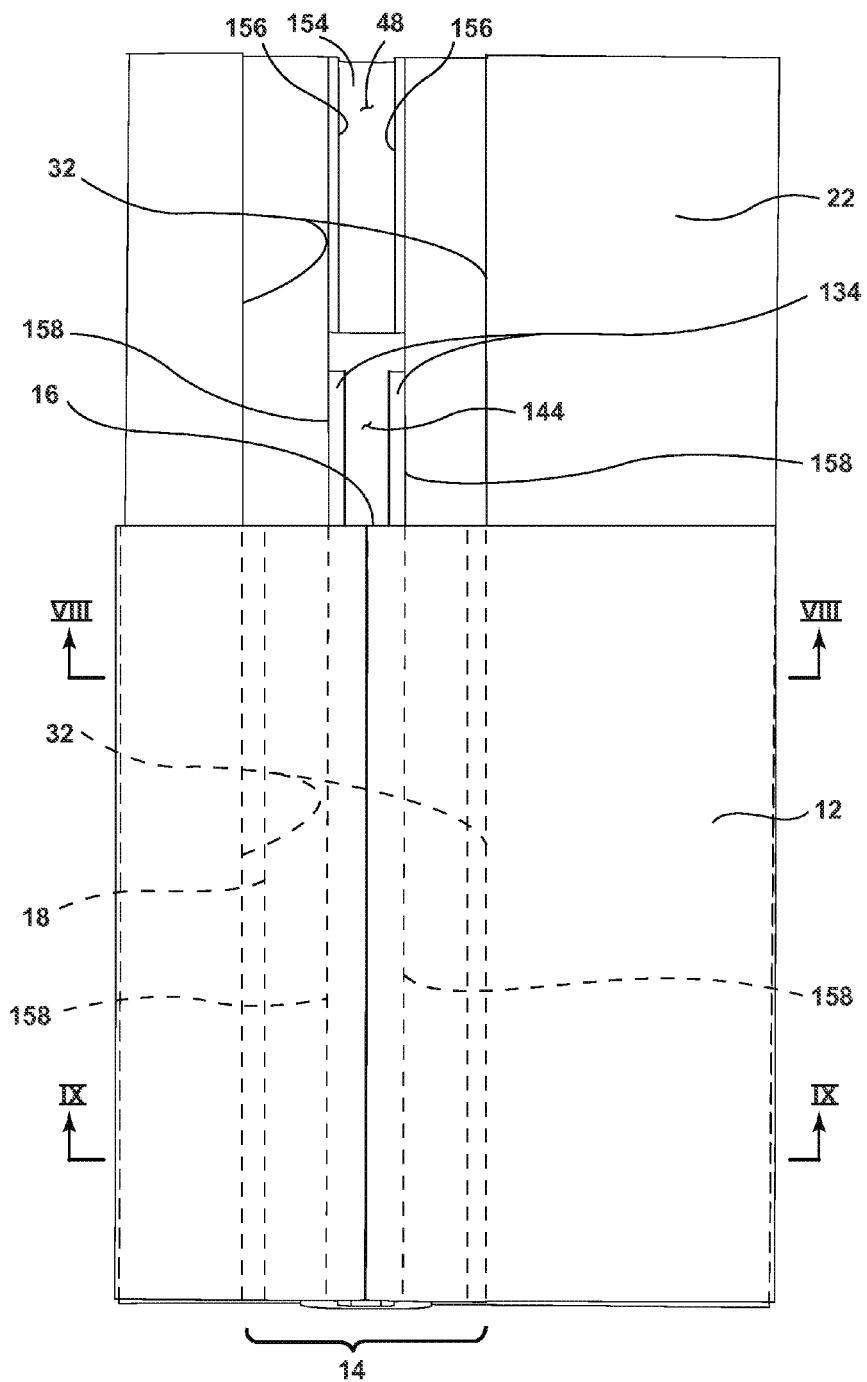
FIG. 7 is a partially cutaway plan view of a portion of the interior trim component illustrated in FIG. 1 disclosing a rigid substrate supporting an overlying stitched cover installed to the substrate with a locking seam alignment guide.

FIG. 7 illustrates the stitched cover 12 overlying and attached to part of the rigid substrate 22. The obverse keyway 32 in this embodiment differs from the alignment guide recess 28. The obverse keyway 32 may have a pair of longitudinal flanges 134 that may define a planar bottom wall 154 of the keyway 32. The longitudinal flanges 134 may extend toward, but not touch, one another to define a longitudinal slot 144. The flanges 134 may also define a reverse keyway 146 set opposite the obverse keyway 32 into a reverse surface of the rigid substrate 22. The reverse keyway 146 may have a width less than the width of the obverse keyway 32.

Figure 8:
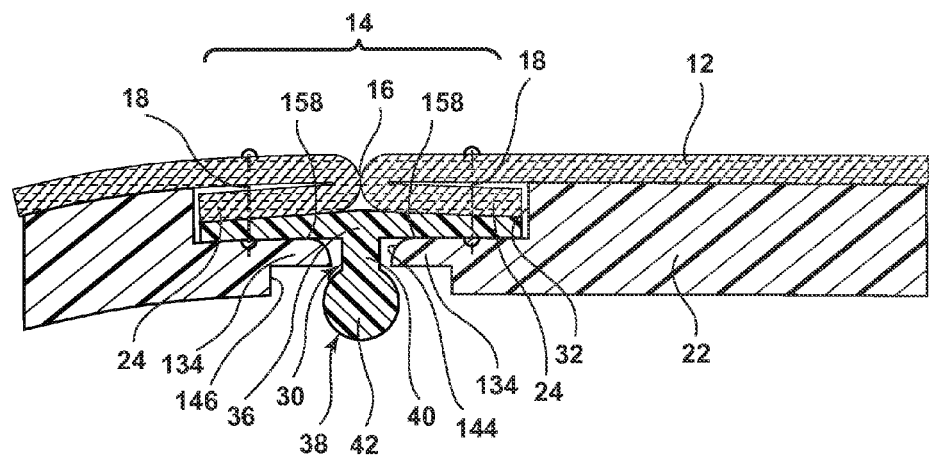
FIG. 8 is a sectional view of a portion of the interior trim component illustrated in FIG. 7 taken along view line 8-8.

Referring also to FIG. 8, the longitudinal flanges 134 may be inwardly rounded along the edges of the slot 144 beginning along a pair of spaced-apart transition lines 158. The flanges 134 may also be configured for controlled flexibility so that the locking key 38 may be snap-fit into the reverse keyway 146 by inserting the rounded head 42 through the longitudinal slot 144 so that the rounded head 42 may be held within the reverse keyway 146 with the neck 40 extending through the longitudinal slot 144. The rounded edges of the longitudinal flanges 34 may facilitate the entry of the head 42 through the longitudinal slot 44 into the reverse keyway 46.

Figure 9:
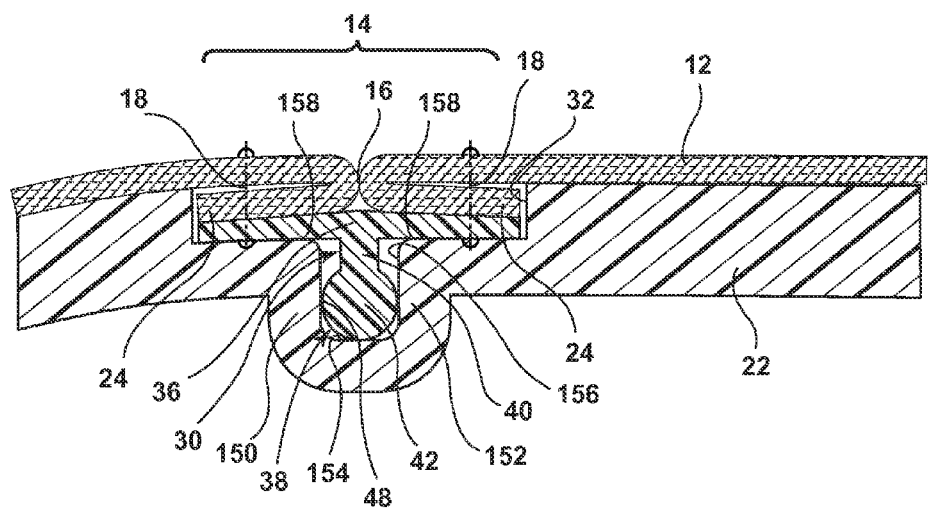
FIG. 9 is a sectional view of a portion of the interior trim component illustrated in FIG. 7 taken along view line 9-9.

FIG. 9 differs from FIG. 8 in that the flanges 134, the slot 144, and the reverse keyway 146, are replaced with a longitudinal groove 48 having a pair of sidewalls 150, 152, and a bottom wall 154 extending therebetween. The sidewalls 150, 152 and bottom wall 154 may define a groove inner surface 156. The longitudinal groove 48 may have a width somewhat greater than the diameter of the rounded head 42, thereby enabling the rounded head 42 to be frictionally seated in the longitudinal groove 48 in contact with the groove inner surface 156.

At selected locations, the configurations illustrated in FIGS. 8 and 9 may alternate as illustrated in FIG. 7 for engaging the rounded head 42 in differing ways. The rounded head 42 may engage the rigid substrate 22 through a friction fit with the groove inner surface 156 (FIG. 9) and/or an interference connection with the longitudinal flanges 134 and longitudinal slot 144 (FIG. 8).

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of forming an interior trim component of a vehicle passenger compartment, comprising the steps of:
   stitching a locking seam alignment guide to an underside of a fabric cover along a seam location, said locking seam alignment guide including a locking key and a stitching flange;
   forming an alignment guide recess corresponding to said seam location in a substrate for providing intimate contact between said locking seam alignment guide and said substrate, the alignment guide recess comprising a first keyway configured to receive the stitching flange and at least a portion of the fabric cover, and a second keyway for retention of the locking key; and
   seating said locking key and said stitching flange into said keyways to lock said fabric cover to said substrate;
   wherein said locking seam alignment guide is held to said alignment guide recess to resist pullout and minimize lateral movement of said cover relative to said substrate.

2. A method in accordance with claim 1 wherein said substrate is one of a cushion or a rigid substrate.

3. A method in accordance with claim 2, wherein forming the alignment guide recess comprises forming the alignment guide recess in said cushion.

4. A method in accordance with claim 2, and forming the alignment guide recess comprises forming the alignment guide recess in said rigid substrate.

5. A method in accordance with claim 1 wherein said locking key is one of a cylindrical shape or a triangular shape.

6. A method in accordance with claim 5 wherein said second keyway is a cylindrical keyway, and said cylindrical locking key is inserted into the cylindrical keyway.

7. A method in accordance with claim 5 wherein said second keyway is a triangular keyway, and said triangular locking key is inserted into the triangular keyway.

8. A method in accordance with claim 1 wherein said stitching flange is one of:
   a flange extending along one side of said locking key; or
   a flange extending along both sides of said locking key.

9. A method in accordance with claim 2 wherein said second keyway includes at least one of:
   a pair of parallel laterally spaced flanges formed in said rigid substrate for interference fit of a cylindrical locking key; or
   a rectangular longitudinal groove formed in said rigid substrate for frictional receipt of a cylindrical locking key.

10. A method in accordance with claim 9 wherein said second keyway includes alternating lengths of said laterally spaced flanges, and said longitudinal groove.

11. A method in accordance with claim 1, and further constructing said fabric cover with a French seam sewn to said locking seam alignment guide.

12. A method in accordance with claim 11, and further configuring said first keyway for seating of said French seam and stitching flange therein to minimize lateral movement of said fabric cover along said substrate.

13. A method in accordance with claim 1, wherein the stitching flange extends laterally relative to the locking key, and forming the alignment guide recess corresponding to said seam location in the substrate comprises forming the first keyway laterally to the second keyway.

* * * * *